United States Patent
Dougherty

(12) 
(10) Patent No.: US 10,882,051 B1
(45) Date of Patent: Jan. 5, 2021

(54) MULCHER WITH IMPROVED CUTTING DRUM

(71) Applicant: Patrick Dougherty, Hinton, OK (US)

(72) Inventor: Patrick Dougherty, Hinton, OK (US)

(73) Assignee: Dougherty Forestry Manufacturing, Ltd. Co., Hinton, OK (US)

( * ) Notice: Subject to any disclaimer, the term of this patent is extended or adjusted under 35 U.S.C. 154(b) by 304 days.

(21) Appl. No.: 15/729,610

(22) Filed: Oct. 10, 2017

Related U.S. Application Data

(60) Provisional application No. 62/406,880, filed on Oct. 11, 2016.

(51) Int. Cl.
| | |
|---|---|
| A01G 23/00 | (2006.01) |
| B02C 18/18 | (2006.01) |
| B02C 18/24 | (2006.01) |
| B02C 21/02 | (2006.01) |
| B02C 18/16 | (2006.01) |

(52) U.S. Cl.
CPC .............. *B02C 18/18* (2013.01); *B02C 18/24* (2013.01); *B02C 21/026* (2013.01); *B02C 2018/162* (2013.01)

(58) Field of Classification Search
CPC ......... B02C 18/18; B02C 18/14; B02C 18/08; A01G 23/00; B27G 13/00; A01B 29/048; A01D 34/52; A01D 34/53

USPC .............................. 241/294, 101.74; 56/294
See application file for complete search history.

(56) References Cited

U.S. PATENT DOCUMENTS

| | | | | |
|---|---|---|---|---|
| 4,951,883 | A * | 8/1990 | Loppoli | A01D 90/105 |
| | | | | 241/101.762 |
| 5,052,757 | A * | 10/1991 | Latham | B28D 1/188 |
| | | | | 299/106 |
| 5,259,692 | A | 11/1993 | Beller et al. | |
| 5,395,286 | A * | 3/1995 | Sgariboldi | A01F 29/005 |
| | | | | 366/603 |
| 7,082,743 | B1 | 8/2006 | Erickson et al. | |
| 7,980,278 | B2 * | 7/2011 | Labbe | A01G 23/00 |
| | | | | 144/172 |
| 9,738,047 | B2 * | 8/2017 | Thomas | B30B 11/246 |
| 2006/0243466 | A1 | 11/2006 | Beller et al. | |
| 2015/0282420 | A1 * | 10/2015 | Campey | A01D 34/53 |
| | | | | 172/21 |

* cited by examiner

*Primary Examiner* — Adam J Eiseman
*Assistant Examiner* — Dylan Schommer
(74) *Attorney, Agent, or Firm* — Crowe & Dunlevy

(57) ABSTRACT

A powered mulcher is configured for attachment to a vehicle. The mulcher includes a frame assembly and a drum assembly contained within the frame assembly. The drum assembly includes a substantially cylindrical drum and a cutting array mounted to the drum. The cutting array includes a plurality of flights connected to the drum and a plurality of cutters attached to each of the plurality of flights. The plurality of flights are configured to push processed plant debris away from the ends and middle of the drum.

12 Claims, 10 Drawing Sheets

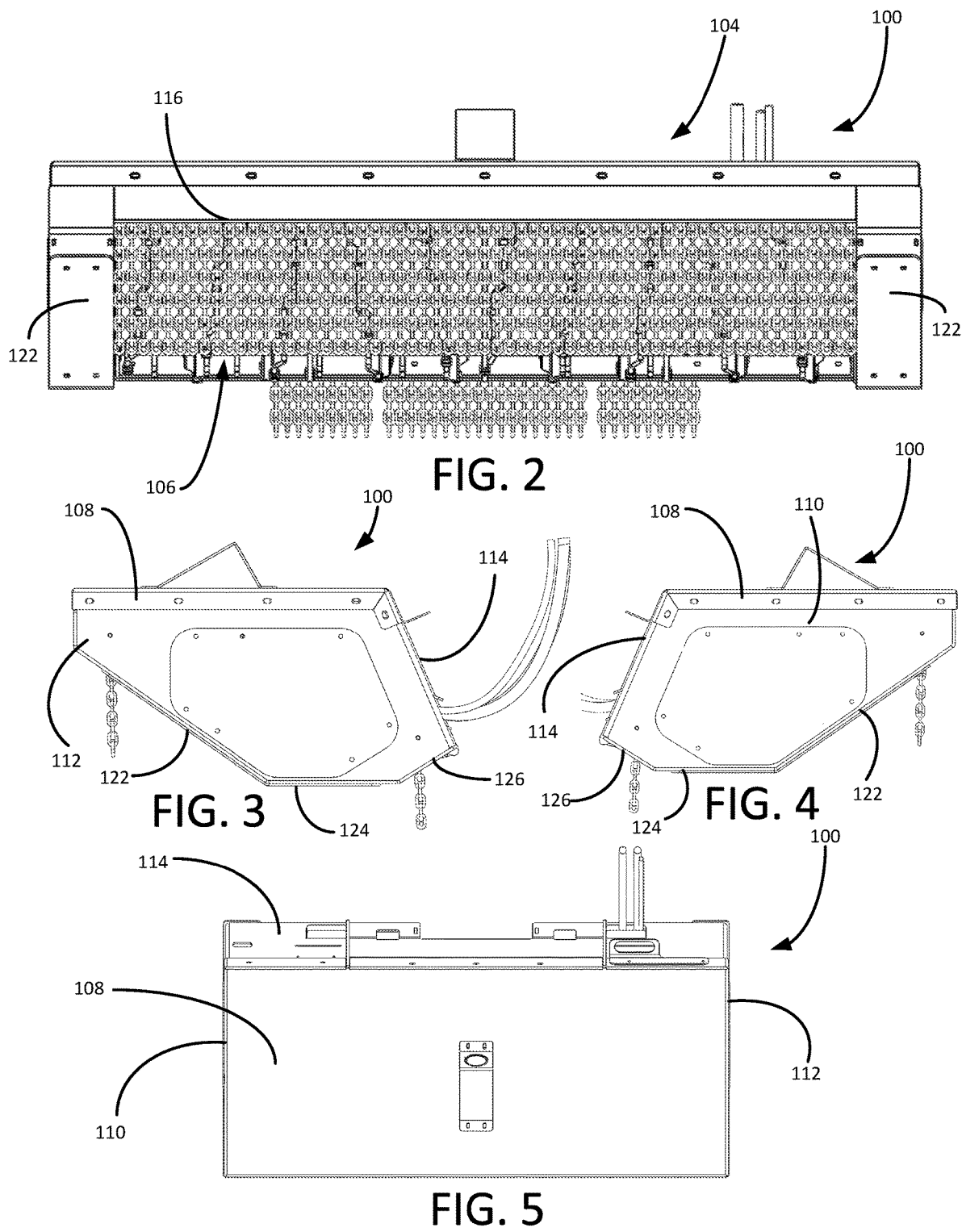

MULCHER WITH IMPROVED CUTTING DRUM

RELATED APPLICATIONS

This application claims the benefit of U.S. Provisional Patent Application Ser. No. 62/406,880 filed Oct. 11, 2016 entitled, "Mulcher with Improved Rotary Drum," the disclosure of which is herein incorporated by reference.

FIELD OF THE INVENTION

The present invention generally relates to equipment used in forestry management and more particularly, but not by way of limitation, to equipment used to fell and mulch trees.

BACKGROUND OF THE INVENTION

A large variety of tree and brush cutting equipment exists on the market today. These devices range from chainsaws to bulldozers and are each designed to efficiently remove woody vegetation. Recently, compact tractors, track loaders and skid loaders have become popular in forestry management. These vehicles are relatively small and maneuverable and offer a wide range of modular tool attachments.

Brush mowers are a class of tools used with compact loaders that are often used to remove small trees. Brush mowers typically have a horizontal disc with free-swinging blades mounted on the perimeter of the disc. Centrifugal force deploys the swinging blades when the disc is rotated at high speeds. Although effective for smaller trees, the free-swinging blades are retracted when the saw contacts larger trees and the speed of the disc decreases. Before a cutting operation can recommence, the operator must allow the disc to return to cutting speed to deploy the swinging blades.

Manufacturers have also produced mulchers that include a horizontally-mounted drum that includes cutting teeth. The drum is weighted so that it carries momentum as it is rotated at speed. Once the drum is brought up to operating speed, the inertia of the drum cuts the material until the rotational speed decreases. The operator must then stop feeding the drum and wait for the speed and inertia to build back up. Because the drum is weighted and operates on inertia, these types of devices are not well-suited for smaller tractors.

Moreover, prior art drum-based devices include cutting teeth that are mounted directly to the drum in an offset, staggered arrangement. The configuration of the teeth on the drum reduces the effectiveness of the cutting process and fails to efficiently remove material from the cutting area. There is, therefore, a need for an improved brush and tree cutting apparatus that overcomes these and other deficiencies in the prior art.

SUMMARY OF THE INVENTION

In one embodiment, the present invention includes a powered mulcher configured for attachment to a vehicle. The powered mulcher includes a frame assembly and a drum assembly contained within the frame assembly. The drum assembly includes a substantially cylindrical drum and a cutting array mounted to the drum. The cutting array comprises a plurality of segmented blade spirals.

In another embodiment, a powered mulcher includes a frame assembly and a drum assembly contained within the frame assembly. The drum assembly includes a substantially cylindrical drum and a cutting array mounted to the drum. The cutting array includes a plurality of cutters mounted to the drum in a series of laterally offset, staggered rings.

In yet another aspect, the present invention includes a powered mulcher configured for attachment to a vehicle, where the mulcher includes a frame assembly, and a drum assembly contained within the frame assembly. The drum assembly includes a substantially cylindrical drum and a cutting array mounted to the drum. The cutting array includes a plurality of flights connected to the drum and a plurality of cutters attached to each of the plurality of flights.

BRIEF DESCRIPTION OF THE DRAWINGS

FIG. 2 is a front view of the mulcher of FIG. 1.

FIG. 3 is a left side view of the mulcher of FIG. 1.

FIG. 4 is a right side view of the mulcher of FIG. 1.

FIG. 5 is a top view of the mulcher of FIG. 1.

WRITTEN DESCRIPTION

Figure 1:
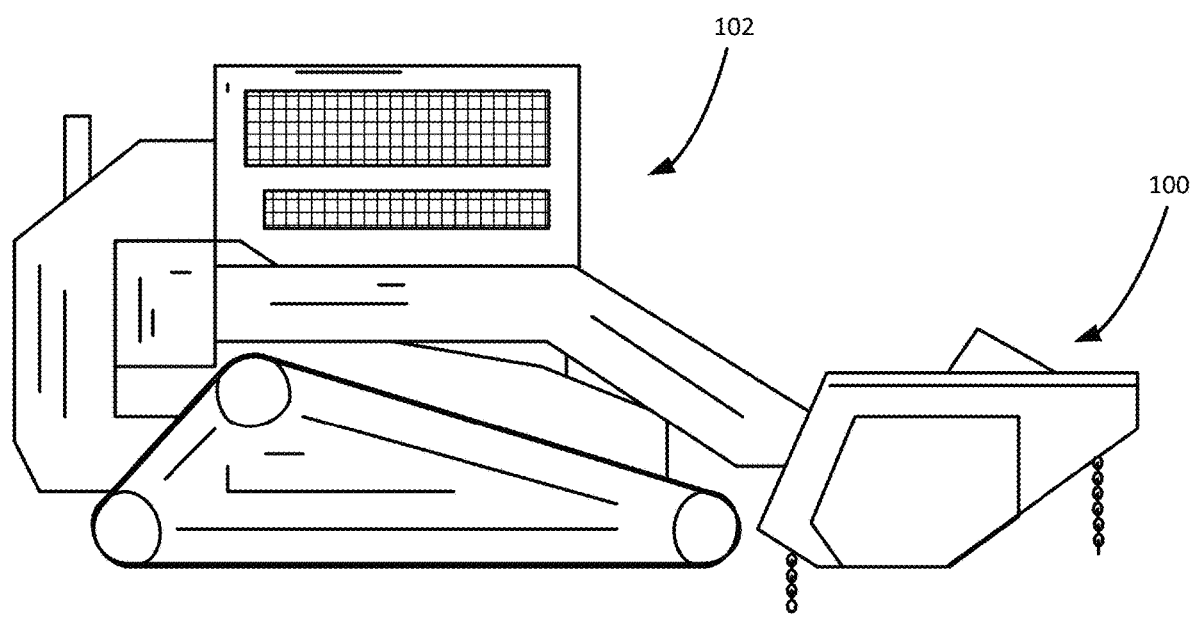
FIG. 1 is a side view of a tree mulcher constructed in accordance with a presently preferred embodiment mounted to a track loader.
Figure 6:
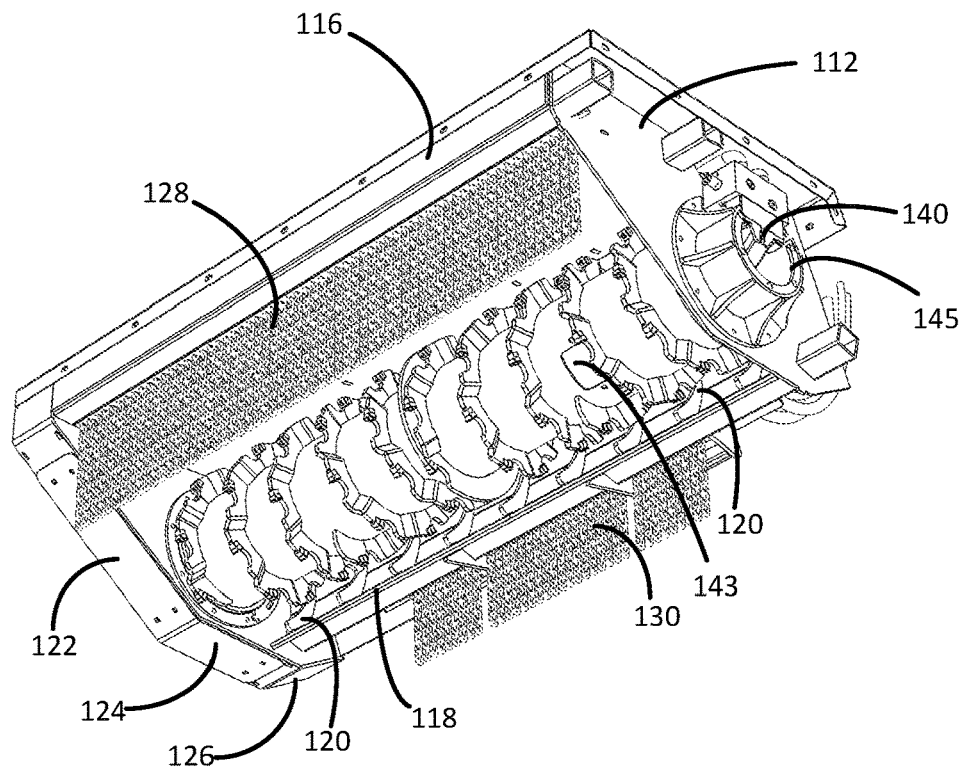
FIG. 6 is a bottom left perspective view of the mulcher.

Referring first to FIG. 1, shown therein is a mulcher 100 constructed in accordance with a presently preferred embodiment. The mulcher 100 is generally intended for use in forestry management services that involve felling, grinding and mulching trees, brush and other vegetation. In presently preferred embodiments, the mulcher 100 is configured for attachment to a tractor 102 that carries the mulcher 100 and provides a source of pressurized hydraulic fluid to the mulcher 100. As depicted in FIG. 1, the tractor 102 is a track loader, but it will be appreciated that the tractor 102 can be any suitable prime mover, including for example, skid loaders and compact tractors with front-mounted articulating lift arms capable of safely supporting the weight of the mulcher. It is preferred that the tractor 102 include an operator cabin that shields the operator from debris generated during the operation of the mulcher 100.

Turning to FIGS. 2-7, shown therein a various views of the mulcher 100. The mulcher 100 generally includes a frame assembly 104 and a drum assembly 106 mounted within the frame assembly 104. The frame assembly 104 includes a top panel 108, right side panel 110, left side panel 112 and rear panel 114 that collectively provide an enclosure for the drum assembly 106. The frame assembly 104 further includes a bull bar 116 mounted to the front of the top panel 108 and a breaker bar 118 mounted to the bottom of the rear panel 114. The bull bar 116 is reinforced and designed to be used in pushing trees and brush. The breaker bar 118 includes a series of breaker guides 120 that extend in a substantially perpendicular direction to the longitudinal axis of the drum assembly 106. During use the drum assembly 106 pulls plant material into the breaker bar 118 and breaker guides 120. The breaker guides 120 are sized and oriented to provide resistance to the lateral movement of debris along the drum assembly 106. This promotes a more thorough and efficient mulching action. Unless otherwise noted, each component of the mulcher 100 is constructed from durable metal.

The left side panel 112 and right side panel 110 each include a front skid 122, a middle skid 124 and a rear skid 126. The front skids 122 support the mulcher 100 on the ground at a downward angle where the bull bar 116 is close to the ground and the breaker bar 118 is elevated from the ground. This position is useful when the mulcher 100 is being pulled back over felled material. The middle skids 124 support the mulcher 100 on the ground in a substantially horizontally level position that is useful when the mulcher is being forced forward over brush or felled trees. The middle skids 124 are used when the mulcher 100 is in the forward "mowing" position. The rear skids 126 support the mulcher 100 on the ground at an inclined angle such that the breaker bar 118 is near the ground and the drum assembly 106 is elevated.

The frame assembly 104 preferably includes a front debris shield 128 and a rear debris shield 130. The front and rear debris shields 128, 130 preferably include a series of hanging chains that reduce the amount of debris that escapes the front and rear of the mulcher 100. The chains are sized so that they do not contact the drum assembly 106. Although chains are presently preferred, it will be appreciated that the front and rear debris shields 128, 130 may also be made from flexible guards or flaps that allow plant material to enter and exit the frame assembly 104 at low speeds.

Referring now to FIGS. 7-12, shown therein are various views of the frame assembly 104 and drum assembly 106. The drum assembly 106 includes a drum 132, a cutting array 134, an internal motor mount 136 and an internal bearing mount 138. The drum 132 is substantially cylindrical and formed from steel tubing. In preferred embodiments, the drum 132 is constructed from tubing with a wall thickness of about ¼".

The motor mount 136 and bearing mount 138 are circular metal plates that are welded or otherwise fixed within the interior of the drum 132. The mulcher 100 includes a motor 140 that is rigidly connected to the frame assembly 104 and rotatably connected to the motor mount 136. In preferred embodiments, the motor 140 is a hydraulic motor that generates torque from pressurized hydraulic fluid supplied by the tractor 102. When energized, the motor 140 rotates the drum 132 within the frame assembly 104.

The motor 140 may optionally be connected to an intermediate bearing 141, such as an overhung load adapter (OHLA), to protect the motor 140 from radial and axial loads generated during cutting. The intermediate bearing 141 and motor 140 are supported by a drive support tube 145 that is connected to the left side panel 112 (partially removed in FIG. 6). The drive support tube 145 extends into the drum 132, where the drive shaft from the motor 140 and intermediate bearing 141 are connected to the motor mount 136. To support the weight of the opposite end of the drum 132, the mulcher also includes an end bearing 142. The end bearing 142 is connected to the bearing mount 138 inside the drum 132 and to the frame assembly 104.

Figure 7:
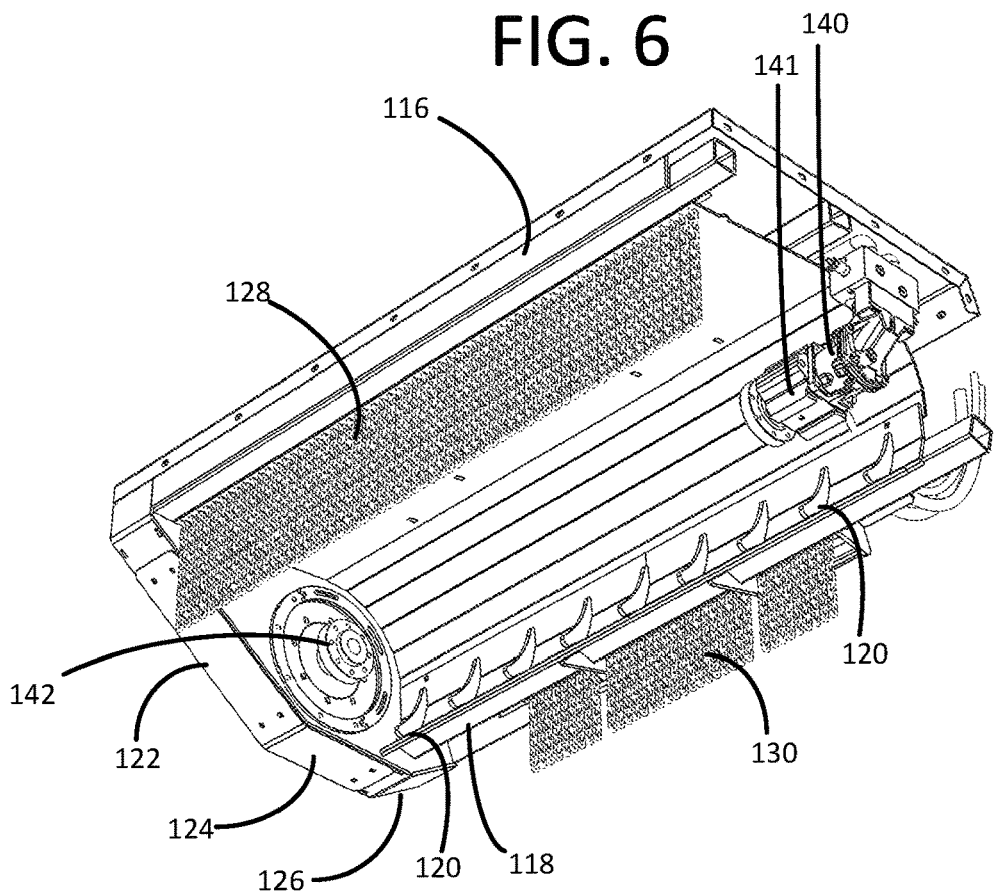
FIG. 7 is a bottom left perspective view of the mulcher, with the drum removed.
Figure 13:
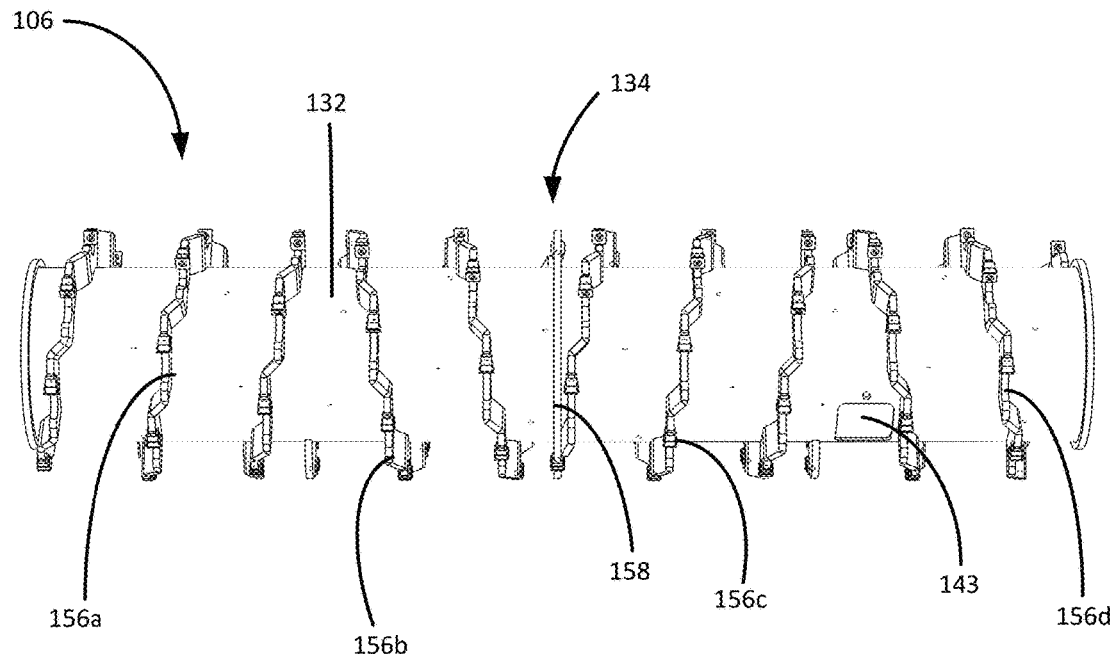
FIG. 13 is a front view of a second embodiment of the drum assembly.
Figure 14:
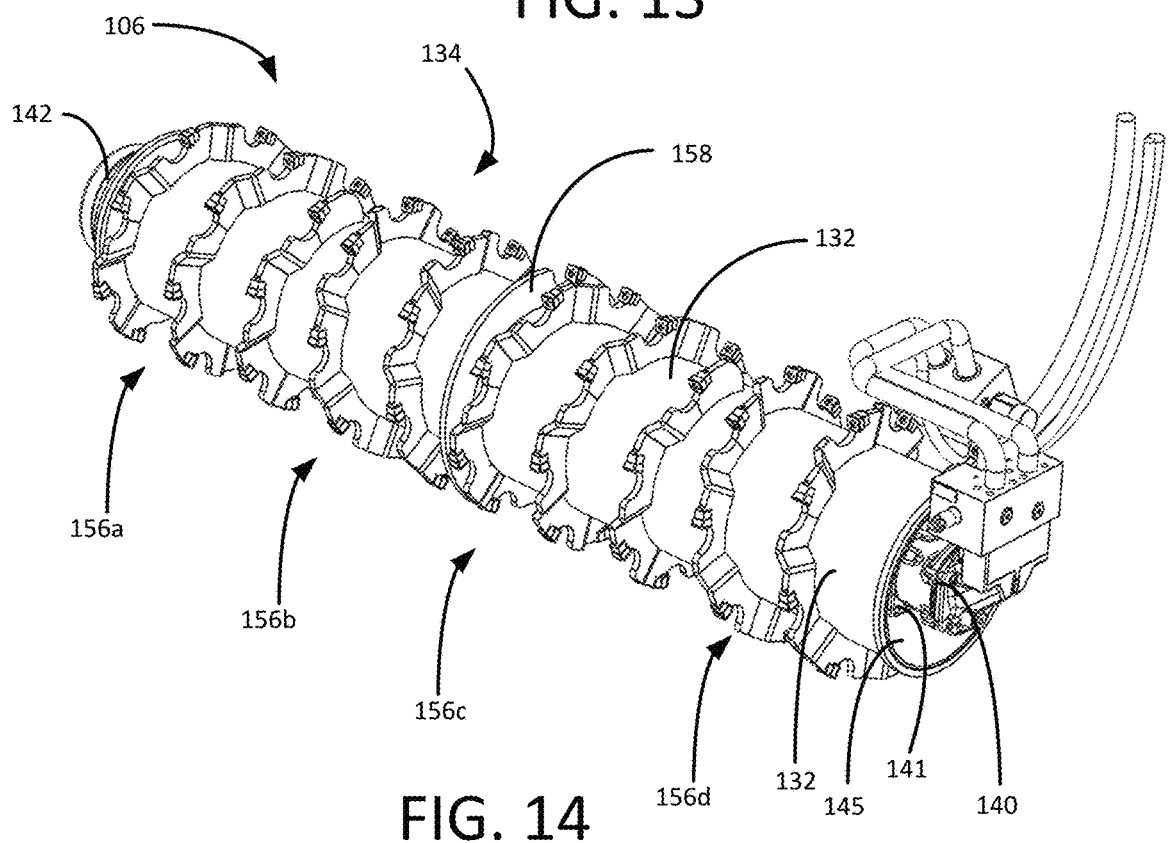
FIG. 14 is a front perspective view of the second embodiment of the drum assembly.

The motor 140, intermediate bearing 141 and end bearing 142 are best seen in FIG. 7, where the left side panel 112 and drum assembly 106 have been removed to illustrate these components. As noted in FIGS. 6 and 13, the drum 132 may include one or more access panels 143 that can be opened to permit the connection of the motor 140 to the motor mount 136 and the bearing 142 to the bearing mount 138.

Figure 11:
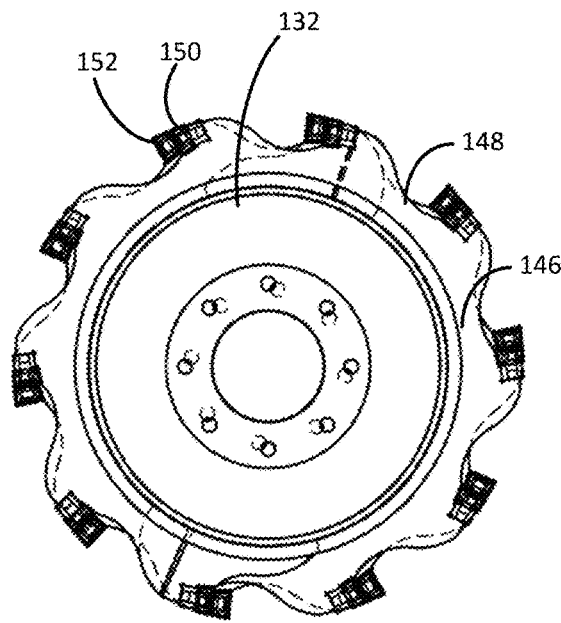
FIG. 11 is a left side view of the drum assembly of FIG. 8.
Figure 12:
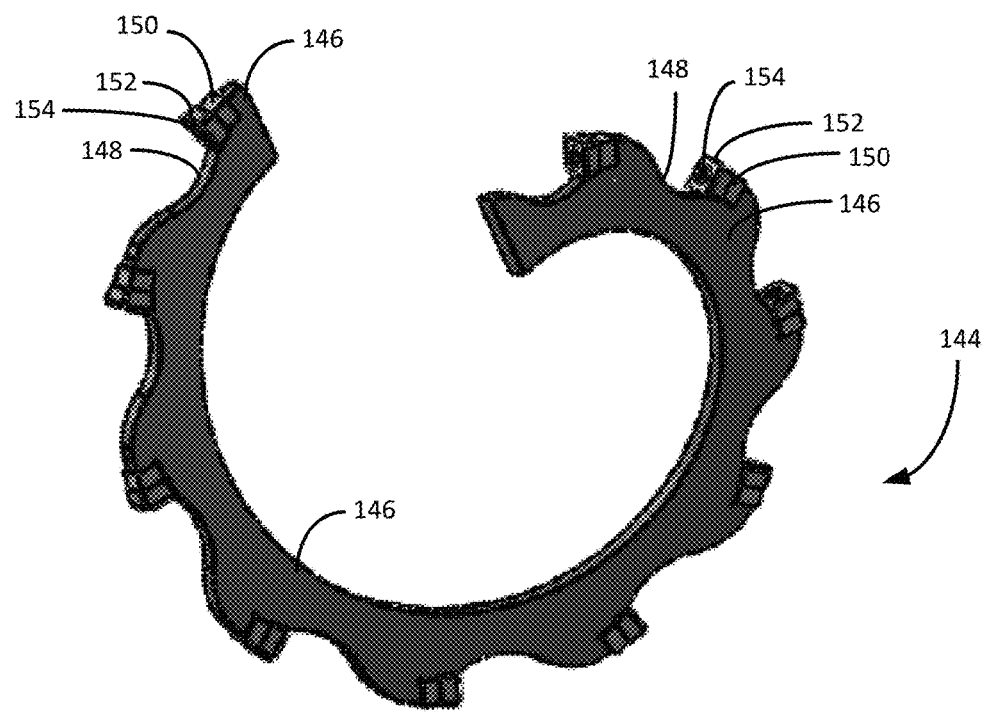
FIG. 12 is a perspective view of a blade flight isolated from the drum assembly of FIG. 8.

The cutting array 134 is uniquely arranged on the drum 132 to promote an efficient cutting and mulching operation. In a first embodiment depicted in FIGS. 8-12, the cutting array 134 includes a combination of one or more left hand narrow flights 144a, right hand narrow flights 144b, left hand wide flights 144c and right hand wide flights 144d. As illustrated in FIG. 12, each of the flights 144 is generally configured as a broken ring in which the ends are laterally separated to produce a spiraled form.

Each of the flights includes a body 146, a kerf 148, a cutter base 150, a cutter 152 and a fastener 154. The body 146 is preferably welded to the drum 132. The cutter base is preferably welded to the body 146 adjacent the kerf 148. The fastener 154 removably secures the cutter 152 to the cutter base 150 so that the cutter 152 can be easily replaced as necessary. In preferred embodiments, each cutter 152 constitutes a square tooth made from steel with a tungsten carbide surface mounted by brazing or some similar methods to the face of the cutter 152 to increase wear life. Each cutter 152 is preferably centered on the body 146 such that the cutter 152 overhangs each side of the body 146 by approximately the same amount. As best seen in FIGS. 11 and 12, each cutter 152 is angled forward of a radial line extending from the center of the drum 132 for better curling of the wood. The kerf 148 in front of the cutter 152 provides a relief area for the curled wood.

Figure 8:
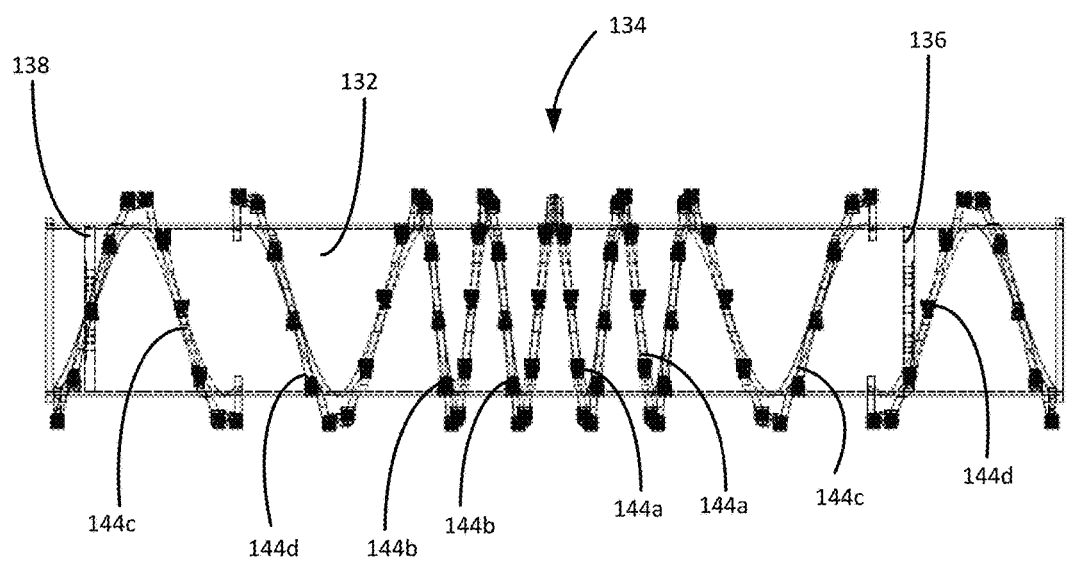
FIG. 8 is a front view of a first embodiment of the drum assembly.
Figure 9:
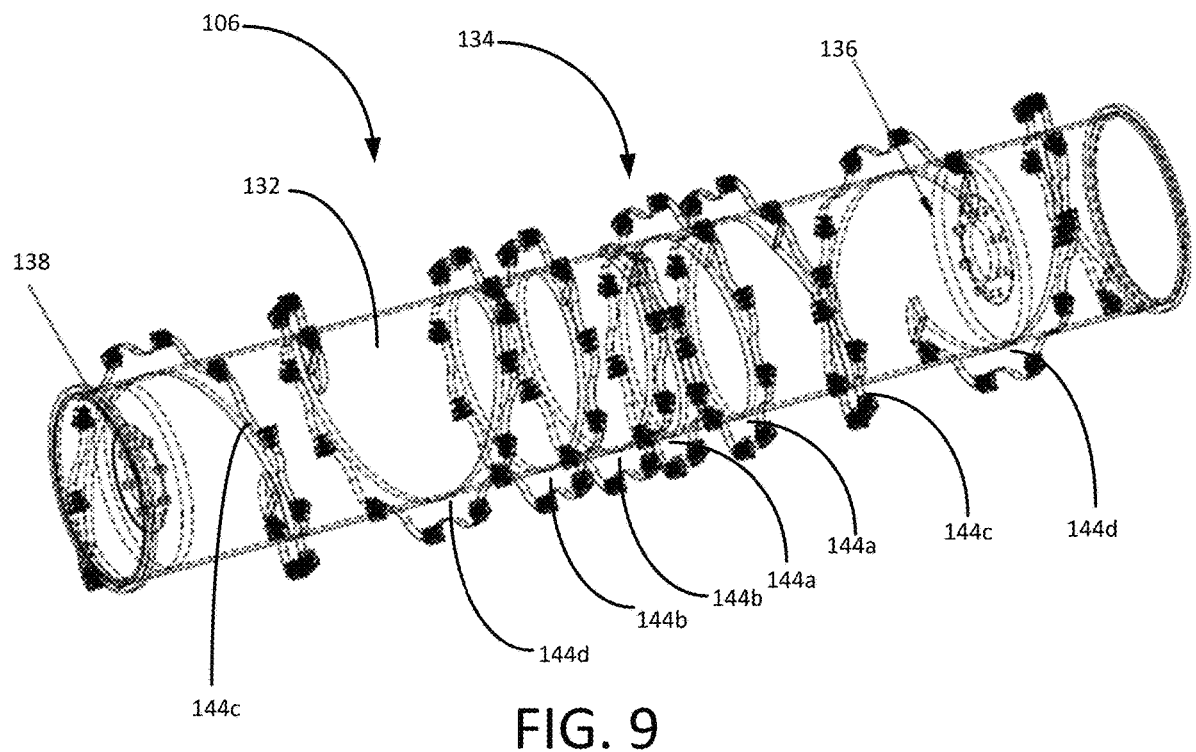
FIG. 9 is a front view of the drum assembly of FIG. 8, with the drum in transparent form.
Figure 10:
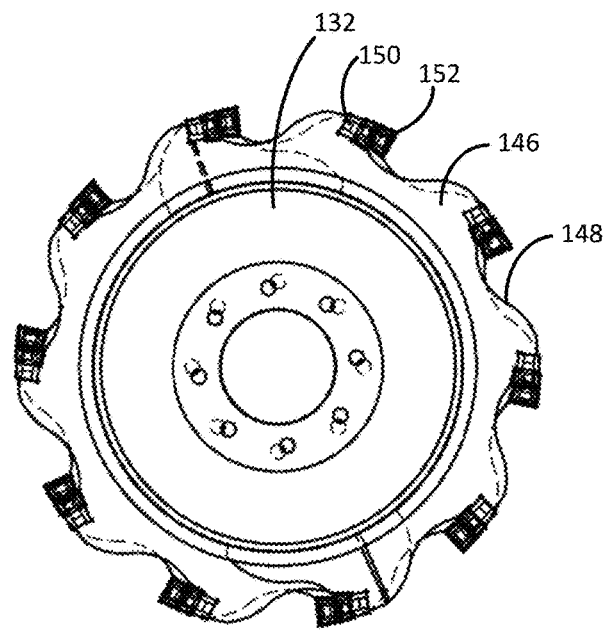
FIG. 10 is a right side view of the drum assembly of FIG. 8.

In the presently preferred embodiments, the flights 144 are arranged on the drum 132 to remove cut material from the frame assembly 104. As illustrated in FIGS. 8-10, the cutting array 134 includes two left hand narrow flights 144a and two right hand narrow flights 144b extending outward from the center of the drum 132. The left hand narrow flights 144a and right hand narrow flights 144b are opposites, or "enantiomers," that are configured to push mulched material toward the outside of the frame assembly 104. The left hand narrow flights 144a and right hand narrow flights 144b are preferably connected end-to-end to produce a continuous flight.

Outboard of the left hand narrow flights 144a is a left hand wide flight 144c. Outboard of the right hand narrow flights 144b is a right hand wide flight 144d. Because the majority of the cutting is done in the center of the drum 132, the cutting array 134 includes a less dense arrangement of cutters toward the ends of the drum 132. At the left end of the drum 132, the cutting array 134 includes a right hand wide flight 144d that is spaced apart and not connected to the adjacent left hand wide flight 144c. Similarly, at the right end of the drum 132, the cutting array 134 includes a left hand wide flight 144c that is spaced apart and not connected to the adjacent right hand wide flight 144d. This configuration of left hand wide flights and right hand wide flights 144c, 144d at the ends of the drum 132 prevents mulched material from becoming jammed against the inside of the right side panel 110 and left side panel 112. The spacing between the flights 144 near the ends of the drum 132 allows the mulched material to drop out of the frame assembly 104.

Turning to FIGS. 13-19, shown therein is the drum assembly 106 with a cutting array 134 constructed in accordance with a second preferred embodiment. In this embodiment, the cutting array 134 includes a plurality of segmented blade spirals 156 and a center blade 158. As shown, the cutting array 134 includes four segmented blade spirals 156 that are oriented with two outer segmented blade spirals 156a, 156d configured to push material toward the center of the drum assembly 106 and two inner segmented blade spirals 156b, 156c configured to push plant material away from the center blade 158. In this way, the four segmented blade spirals 156 encourage the movement of shredded material away from the ends of the drum assembly 106.

Figure 15:
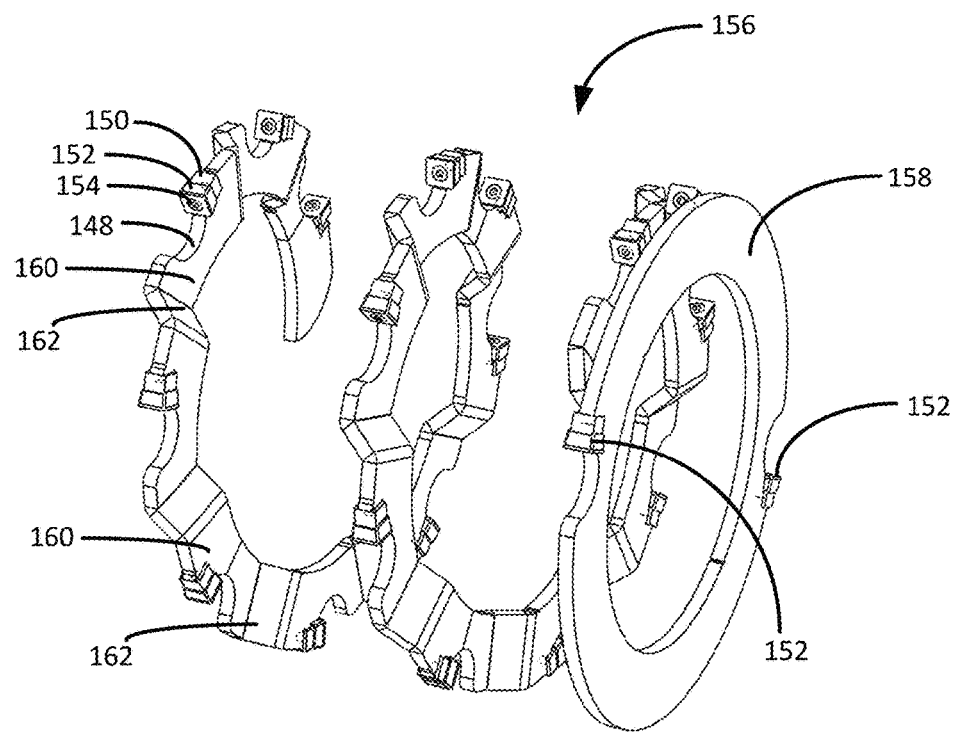
FIG. 15 is a perspective view of a segmented blade spiral and center blade from the drum assembly of FIG. 13.
Figure 16:
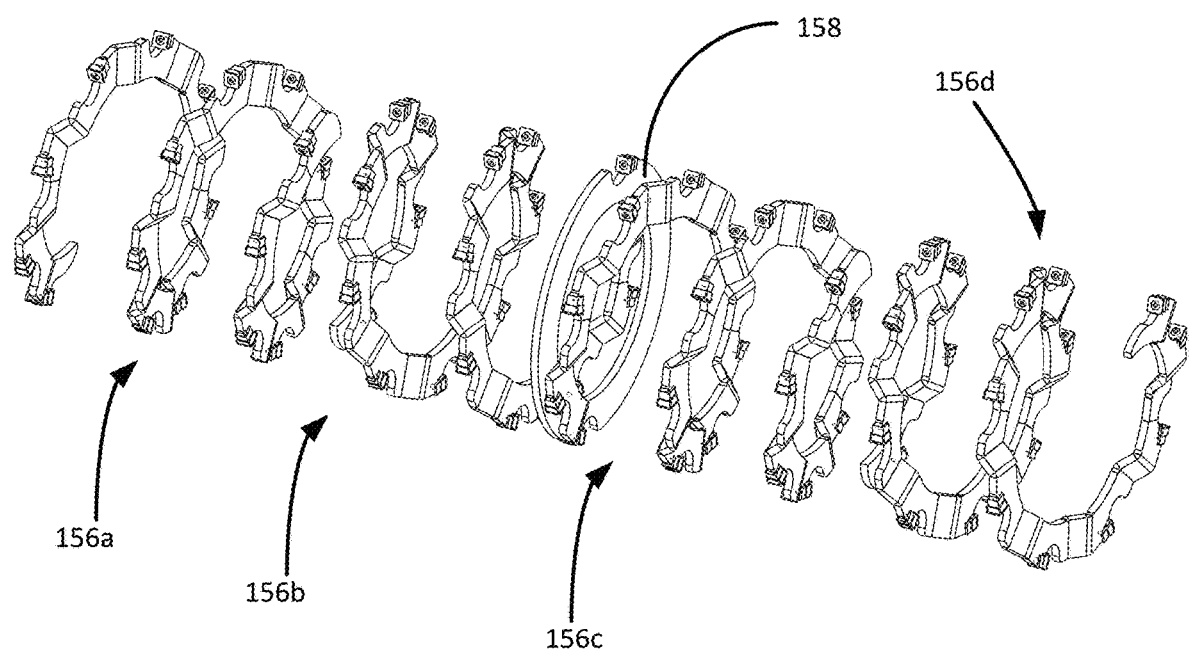
FIG. 16 is a perspective view of the series of segmented blade spirals and center blade of the drum assembly of FIG. 13.
Figure 17:
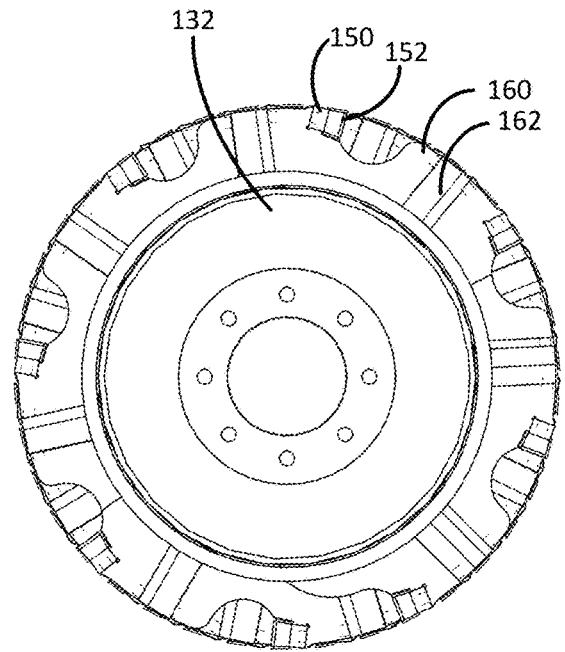
FIG. 17 is a right side view of the drum assembly of FIG. 13.
Figure 18:
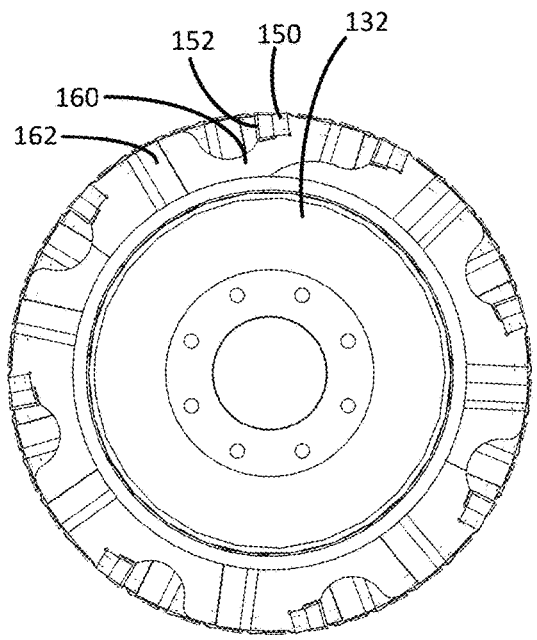
FIG. 18 is a left side view of the drum assembly of FIG. 13.
Figure 19:
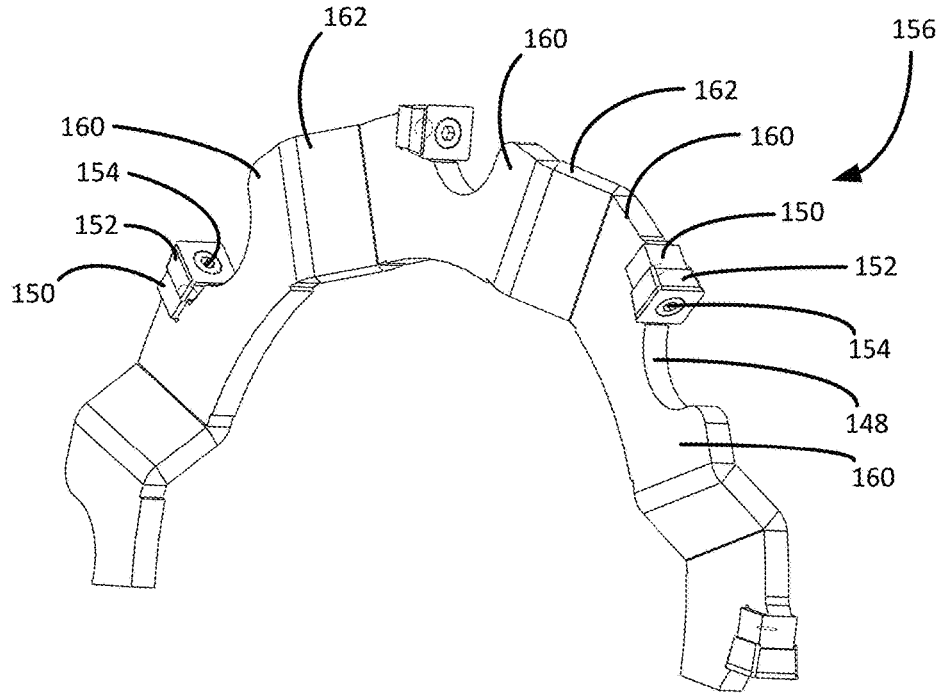
FIG. 19 is a close-up, perspective view of a portion of the segmented blade spiral from the drum assembly of FIG. 13.

As more clearly illustrated in FIG. 15, each segmented blade spiral 156 includes a series of cutter segments 160 that include the kerf 148, cutter base 150, cutter 152 and fastener 154. However, unlike the flights 144 that include a continuously curved body 146, the cutter segments 160 of the segmented blade spirals 156 are substantially straight and attached to intervening lateral segments 162. The cutter segments 160 and lateral segments 162 each include an interior surface that is contoured to match the cylindrical outer surface of the drum 132. The segmented blade spirals 156 can be manufactured by welding the cutter segments 160 to the lateral segments 162, or by bending a unitary ring with a metal brake to form the cutter segments 160 and lateral segments 162. As noted in FIG. 15, the center blade 158 is substantially circular with no lateral offset and is configured to fit around the outer surface of the drum 132. Although the contemplated embodiments are not so limited, the center blade 158 depicted in FIG. 13-16 includes only a pair of cutters 152.

Figure 20:
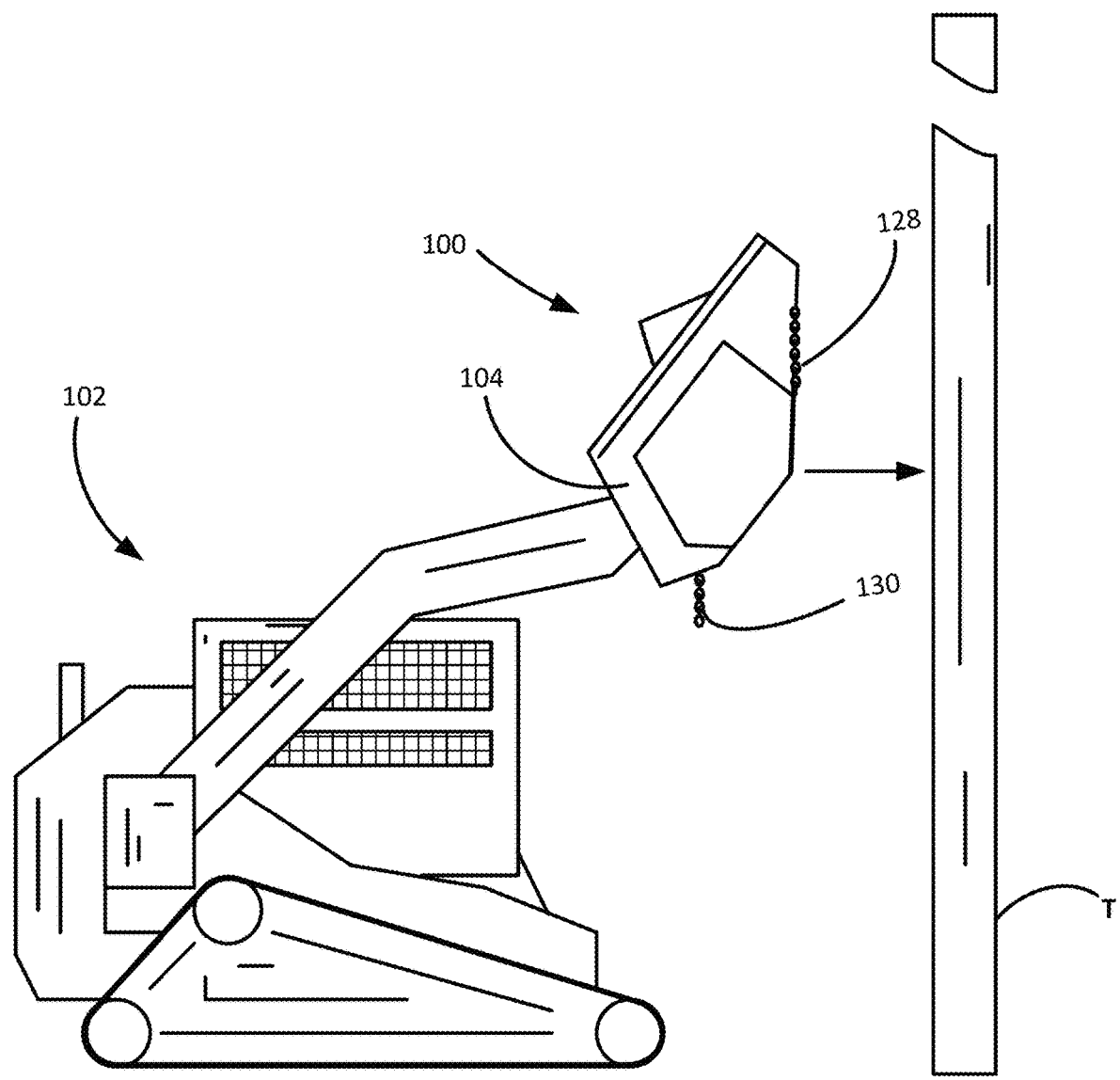
FIG. 20 is a side view of the tree mulcher and track loader of FIG. 1 with the tree mulcher in a tree-felling position.
Figure 21:
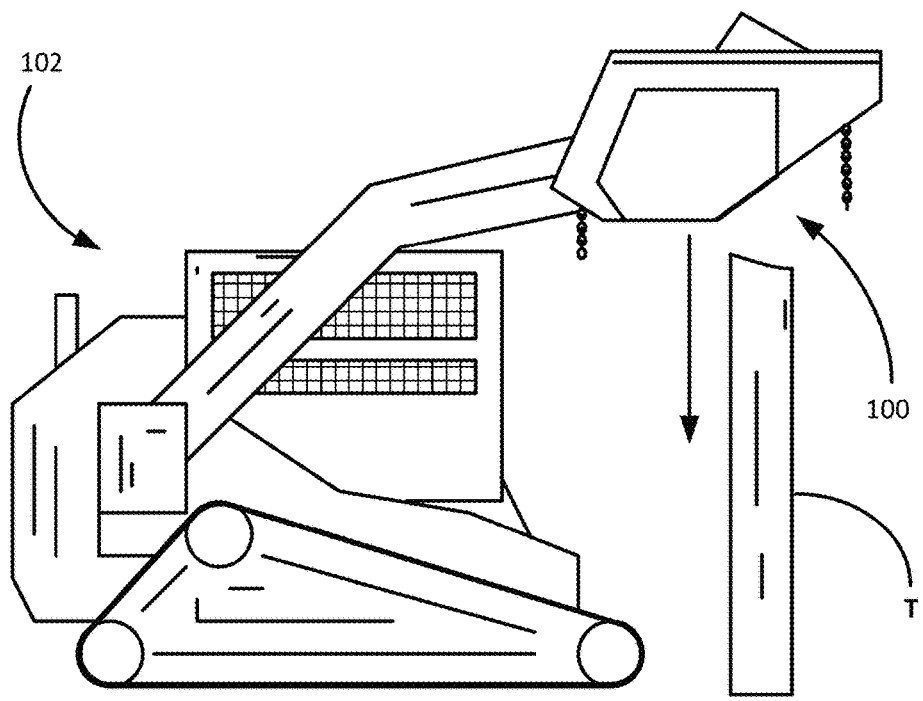
FIG. 21 is a side view of the tree mulcher and track loader of FIG. 1 with the tree mulcher in a trunk-mulching position.
Figure 22:
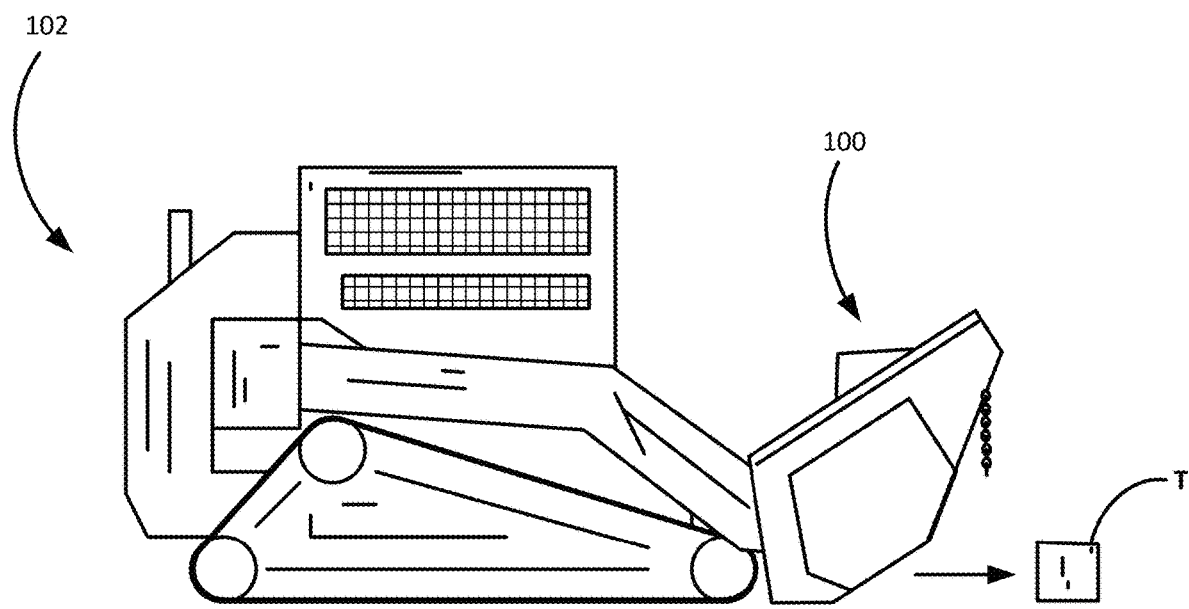
FIG. 22 is a side view of the tree mulcher and track loader of FIG. 1 with the tree mulcher in a forward mowing position.

The mulcher 100 is versatile and well-suited for performing a variety of tree and brush removal operations. As illustrated in FIG. 20, the mulcher 100 has been lifted and articulated into a tree-felling position in which the drum assembly 106 is permitted to contact the tree (T). By pushing the center of the drum assembly 106 against the tree, the top portion of the tree can be severed from the trunk. Once the tree has been felled, the mulcher 100 can be repositioned to perform a downward mulching operation to grind the remaining tree trunk (as depicted in FIG. 21). Once the remaining trunk has been ground down, the mulcher can be pushed forward over the remaining limbs as depicted in FIG. 22 and in FIG. 1.

Thus, the mulcher 100 is capable of rapidly removing and mulching a tree and tall brush using a tractor 102 that is relatively small and easy to maneuver. The mulcher 100 overcomes many of the deficiencies of the prior art because the drum assembly 106 is lightweight and designed to provide a continuous mulching operation without clogging or losing cutting power. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein and within the appended claims. It will be appreciated by those skilled in the art that the teachings of the present invention can be applied to other systems without departing from the scope and spirit of the present invention.

It is claimed:

1. A powered mulcher configured for attachment to a vehicle, the mulcher comprising:
    a frame assembly; and
    a drum assembly contained within the frame assembly, wherein the drum assembly comprises:
        a substantially cylindrical drum a first end, a second end and a center between the first end and the second end; and
        a cutting array mounted to the drum, wherein the cutting array comprises:
            a first right hand narrow flight extending outward from the center of the drum toward the first end of the drum;
            a first right hand wide flight outboard of the first right hand narrow flight;
            a first left hand wide flight outboard of the first right hand wide flight;
            a first left hand narrow flight extending outward from the center of the drum toward the second end of the drum;
            a second left hand wide flight outboard of the first left hand narrow flight; and
            a second right hand wide flight outboard of the second left hand wide flight.

2. The powered mulcher of claim 1, wherein the each of the first right hand narrow flight, first right hand wide flight, first left hand wide flight, first left hand narrow flight, second left hand wide flight, and second right hand wide flight comprises:
    a body;
    a kerf within the body;
    a cutter base adjacent the kerf; and
    a cutter connected to the cutter base.

3. The powered mulcher of claim 2, wherein the body of each of the plurality of flights comprises a spiral with an interior surface that matches the cylindrical drum.

4. The powered mulcher of claim 1, wherein the first left hand narrow flight is an enantiomer of the first right hand narrow flight.

5. The powered mulcher of claim 1, wherein the cutting array further comprises:
    a second right hand narrow flight between the first right hand narrow flight and the first right hand wide flight; and
    a second left hand narrow flight between the first left hand narrow flight and the second left hand wide flight.

6. The powered mulcher of claim 1, wherein the drum assembly further comprises:
    a motor mount inside a first end portion of the drum;
    a bearing mount inside a second end portion of the drum;
    a motor connected to the motor mount, wherein the motor is at least partially enclosed within the drum; and
    a bearing connected to the bearing mount, wherein the bearing is at least partially enclosed within the drum.

7. A powered mulcher configured for attachment to a vehicle, the mulcher comprising:

a frame assembly; and
a drum assembly contained within the frame assembly, wherein the drum assembly comprises:
   a substantially cylindrical drum; and
   a cutting array mounted to the drum, wherein the cutting array comprises:
      a center blade positioned on the drum;
      a first outer blade spiral positioned on the drum on a first side of the center blade, wherein the first outer blade spiral is configured to push plant material toward the center blade;
      a second outer blade spiral positioned on the drum on a second side of the center blade, wherein the second outer blade spiral is configured to push plant material toward the center blade;
      a first inner blade spiral positioned between the first outer blade spiral and the center blade, wherein the first inner blade spiral is configured to push plant material away from the center blade toward the first outer blade spiral; and
      a second inner blade spiral positioned between the second outer blade spiral and the center blade, wherein the second inner blade spiral is configured to push plant material away from the center blade toward the second outer blade spiral.

8. The powered mulcher of claim 7, wherein each of the first outer blade spiral, second outer blade spiral, first inner blade spiral and second inner blade spiral comprises a plurality of substantially straight cutter segments connected to one another by a series of intervening lateral segments.

9. The powered mulcher of claim 8, wherein each of the plurality of cutter segments includes:
   a kerf within the cutter segment;
   a cutter base adjacent the kerf; and
   a cutter connected to the cutter base.

10. The powered mulcher of claim 7 wherein the first outer blade spiral and the second outer blade spiral are configured as enantiomers of one another.

11. The powered mulcher of claim 10, wherein the first inner blade spiral and the second inner blade spiral are configured as enantiomers of one another.

12. The powered mulcher of claim 11, wherein the drum assembly further comprises:
   a motor mount inside a first end portion of the drum;
   a bearing mount inside a second end portion of the drum;
   a motor connected to the motor mount, wherein the motor is at least partially enclosed within the drum; and
   a bearing connected to the bearing mount, wherein the bearing is at least partially enclosed within the drum.

\* \* \* \* \*